United States Patent [19]

Yankoff

[11] Patent Number: 4,695,208
[45] Date of Patent: Sep. 22, 1987

[54] TOOL HOLDER

[76] Inventor: Gerald K. Yankoff, 8273 Coppernail Way, Westchester, Ohio 45069

[21] Appl. No.: 798,122

[22] Filed: Nov. 14, 1985

[51] Int. Cl.$^4$ .................. B23B 27/10; B23B 27/16; B23B 27/22

[52] U.S. Cl. ........................... 407/106; 407/11; 407/93; 407/100; 407/101

[58] Field of Search ............... 407/11, 106, 109, 93, 407/91, 94, 98, 100, 101, 107, 108, 110

[56] References Cited

U.S. PATENT DOCUMENTS

| | | |
|---|---|---|
| 160,161 | 2/1875 | Clay . |
| 354,498 | 12/1886 | Vanden Kerchove . |
| 522,588 | 7/1894 | Chouteau . |
| 1,119,669 | 12/1914 | Wigness . |
| 1,296,536 | 3/1919 | Leech . |
| 1,695,955 | 12/1928 | Frayer . |
| 1,940,220 | 12/1933 | McGrath . |
| 2,188,631 | 1/1940 | Kraus . |
| 2,237,901 | 4/1941 | Chun . |
| 2,360,385 | 10/1944 | Anderson . |
| 2,653,517 | 9/1953 | Pigott . |
| 2,815,688 | 12/1957 | Forbes et al. . |
| 2,848,790 | 8/1958 | McMann . |
| 2,925,224 | 2/1960 | Cunningham . |
| 3,002,410 | 10/1961 | Lee . |
| 3,037,264 | 6/1962 | Mossberg . |
| 3,123,896 | 3/1964 | Wilson ................. 407/110 |
| 3,176,330 | 4/1965 | Jennings . |
| 3,205,558 | 9/1965 | Stier ...................... 407/93 |
| 3,323,195 | 6/1967 | Vanderjagt . |
| 3,364,800 | 1/1968 | Benjamin et al. . |
| 3,543,363 | 12/1970 | Diemond ............... 407/110 |
| 3,591,306 | 7/1971 | Kaser . |
| 3,754,309 | 8/1973 | Jones et al. ............. 407/77 |
| 3,808,656 | 5/1974 | Lindskog . |
| 3,816,018 | 6/1974 | Hlocky . |
| 4,040,764 | 8/1977 | Baturka . |
| 4,047,826 | 9/1977 | Bennett . |
| 4,072,438 | 2/1978 | Powers . |
| 4,115,024 | 9/1978 | Sussmuth . |
| 4,159,885 | 7/1979 | Schott . |
| 4,302,135 | 11/1981 | Lillie . |
| 4,312,250 | 1/1982 | Yankoff . |
| 4,318,645 | 3/1982 | McCreery . |
| 4,332,513 | 6/1982 | Gowanlock ............ 407/101 |
| 4,363,576 | 12/1982 | Zweekly ................ 407/109 |

FOREIGN PATENT DOCUMENTS

| | | |
|---|---|---|
| 0100376 | 2/1984 | European Pat. Off. ........ 407/11 |
| 2843433 | 4/1980 | Fed. Rep. of Germany . |
| 3004166 | 8/1980 | Fed. Rep. of Germany . |
| 1279749 | 1/1961 | France . |
| 2244590 | 4/1975 | France . |
| 0218821 | 6/1961 | Netherlands . |
| WO84/03239 | 8/1984 | PCT Int'l Appl. ........... 407/11 |
| 1369096 | 10/1974 | United Kingdom . |
| 2082485 | 3/1982 | United Kingdom ........ 407/106 |

OTHER PUBLICATIONS

Catalog excerpts from Kennametal Inc. catalog, pp. 81–84.
Hydraulic Chipbreaking article from Production Engineering Laboratory (3 pages).

*Primary Examiner*—Nicholas P. Godici
*Assistant Examiner*—Jerry Kearns
*Attorney, Agent, or Firm*—Wood, Herron & Evans

[57] ABSTRACT

A tool holder which is convertible to perform a variety of machining operations such as threading, turning and grooving comprises a support bar formed with a cavity which receives a mounting block having a seat adapted to support an insert so that the top surface of the insert is exposed and its cutting edge extends outwardly from the seat. The insert is clamped within the seat by a clamping block, which is secured atop the insert by a machine screw. The top edge of the clamping block is formed with a beveled bearing surface which engages the head of the machine screw so that forces are applied to the clamping block upon tightening of the screw which urge the insert downwardly, rearwardly and inwardly against the walls of the mounting block seat. The clamping block and support bar also include coolant delivery passageways terminating in a discharge orifice lying atop the top surface of the insert, which function to accelerate coolant from a low velocity, high pressure stream to a coolant jet having a velocity of at least 250 feet per second when ejected from the discharge orifice across the top surface of the insert toward its cutting edge.

4 Claims, 4 Drawing Figures

TOOL HOLDER

BACKGROUND OF THE INVENTION

This invention relates to tool holders, and, more particularly, to a tool holder having an improved insert clamping mechanism and a high velocity coolant delivery system for breaking chips and extending tool life.

Tool holders for performing metal working operations such as turning, boring, shaping, grooving and threading generally comprise a support bar formed with a cavity which is adapted to receive a shim in the form of a flat plate, or a support block formed with a seat. An insert having a top surface terminating with a cutting edge is mounted atop the shim, or within the seat in the support block, so that the top surface of the insert is exposed and the cutting edge extends outwardly from the holder. In some insert designs, particularly for threading operations, the top surface of the insert is formed with a V or U-shaped groove or notch formed at an angle relative to the cutting edge.

The insert is secured atop the shim, or within the seat of the support block, by a clamp which comprises an arm having one end terminating with a clamping edge. The clamp is bolted to the support bar so that the clamping edge engages the top surface of the insert forming essentially line contact therebetween.

One problem with the clamping mechanism of prior art tool holders is that the clamping force applied by the clamps described above is limited to the line of contact between the top surface of the insert and the clamping edge of the clamp. Additionally, in clamping most inserts, the clamp applies a force in only one direction against the insert urging it downwardly atop the shim or the bottom surface of the seat formed in the support block. As a result of the application of a clamping force to the insert over a limited area and in a single direction, the insert often becomes loosened within the tool holder cavity during a cutting operation which quickly results in failure of the insert.

Some improvement in clamping is achieved in prior art tool holders by employing the notched type of insert described above. The clamping edge of the clamp engages the sidewall of the U-shaped notch so as to urge the insert downwardly, and, to a limited degree, inwardly within the seat in the tool holder due to the angle of the notch. The problem with this design is that relatively close tolerances must be maintained in forming the notch in the insert, and in positioning the clamp and the tool holder, so that the clamping edge of the clamp engages the sidewall of the notch in the top surface of the insert. If such tolerances are not maintained therebetween, the insert cannot be securely clamped within the seat and becomes loosened during a machining operation.

In performing machining operations with prior art tool holders such as described above, the cutting edge of the insert is moved into engagement with a workpiece to remove a chip of metal. The chips comprise a plurality of thin, generally rectangular shaped sections of metal which slide relative to one another along shear planes when separated from the workpiece. This shearing movement of the thin metal sections forming the chip generates a substantial amount of heat in addition to the heat generated by abrasion of the cutting edge of the insert as it contacts the workpiece.

Among the causes of failure of the cutting inserts mounted in the types of tool holders employed in the prior art are abrasion between the cutting insert and workpiece, and a problem known as cratering. Cratering results from the intense heat developed in the formation of the chip, and the frictional engagement of the chip with the cutting insert. As the metal forming the chip is sheared from the workpiece, it moves along the top surface of the insert and in some cases along the clamp which secures the insert in place. Many inserts include a chip breaker groove on the surface which faces the chip for turning the chip upwardly away from the top surface of the insert. However, even with chip breaker grooves, at least a portion of the upper surface of the insert inwardly from its cutting edge is in frictional engagement with the chip.

Due to this frictional engagement, and the intense heat generated in the formation of the chip, craters are formed on the exposed, upper surface of the insert. Once these craters become deep enough, the entire insert is subject to cracking and failure along its cutting edge, and along the sides of the insert. Cratering has become a particular problem in recent years due to the development and extensive use of alloy steels, super hard alloys such as titanium, stainless and nickel-based alloys.

One approach to obtaining increased insert life has been to attempt to reduce the temperature of the cutting insert and chip by a quenching operation in which the tool holder and workpiece are flooded with a low pressure stream of coolant consisting of a mixture of oil and water. Typically, a nozzle is disposed several inches above the cutting tools and workpiece which directs a low pressure stream of coolant onto the workpiece tool holder and on top of the chips being produced. This technique, known as flood cooling, effectively cools only the upper surface of the chips and that portion of the tool holder near the edge of the cavity wherein the insert is clamped.

One limitation of prior art tool holders is that most are designed for use with flood cooling systems of the type described above. However, flood cooling has proven to be ineffective in removing heat from the cutting area. The underside of the chip which makes contact with the cutting insert, and the interface between the cutting insert and workpiece, are not cooled by a low pressure stream of coolant directed from above the tool holder. This is because the heat produced in the area of the chip and the cutting edge of the insert, particularly at the high operating speeds of modern milling or turning machines, vaporizes the coolant well before it can flow near the cutting edge of the insert.

Prior art tool holder have been designed to improve upon the flood cooling technique of directing a low velocity stream of coolant onto the cutting area from a location above the tool holder. Such tool holders include coolant delivery passageways terminating with one or more discharge orifices oriented to eject coolant across the top surface of the insert and beneath the chips being formed. The designs known to the inventor fail to achieve cooling in the immediate area of the cutting edge - workpiece interface where the intense heat is produced, and are thus no more effective than the other flood cooling techniques described above.

Tool holders of the types described above, which employ flood cooling, are not only ineffective in prolonging insert life but can actually reduce insert life in some instances due to thermal failure of the inserts. This occurs because a high temperature gradient is developed between the very hot area immediately surrounding the cutting edge of the insert, and the cooler inner portion of the insert mounted in the cavity of the tool holder. The coolant cannot reach the cutting edge of the insert before it is vaporized and thus effectively cools only the area of the insert which is held in the tool holder. This extreme difference in temperature between the cutting edge and the remainder of the cutting insert can result in thermal failure.

In addition to limited tool life, another pervasive problem with tool holders currently employed in the cutting tool industry involves the proper breakage and removal of chips from the area of the cutting insert and holder. Preferably, chips should be broken into short segments when sheared from the workpiece. If they are not broken but form in a continuous length, the chips tend to wrap around the cutting insert, tool holder and/or the workpiece which can lead to tool failure or at least require periodic interruption of the machining operation to clear the area of impacted or bundled chips.

Current attempts to solve the chip breaking and removal problem are limited to various designs of cutting inserts having a chip breaker groove, which is a groove formed in the top surface of the insert immediately adjacent the cutting edge. Chip breaker grooves engage the chips as they shear from the workpiece and turn or bend them upwardly from the surface of the insert so that they tend to fracture. While acceptable performance has been achieved with some chip breaker groove designs in some applications, variables in machining operations such as differing materials, types of machines, depths of cuts, feed rates and speeds make it virtually impossible for one chip breaker groove design to be effective in all applications. This is evidenced by the multitude of chip breaker designs now available which are intended to accommodate the widely varying machining conditions which can occur in industry. Selection of a suitable cutting insert for a particular application, if one is available at all, can be a difficult problem.

SUMMARY OF THE INVENTION

It is therefore among the objects of this invention to provide a tool holder which is convertible for use in a variety of metal working operations such as threading, turning, shaping and grooving, which securely clamps an insert without loosening during a cutting operation, which is capable of delivering a high velocity coolant jet across the exposed, top surface of the insert toward its cutting edge and beneath the underside of chips formed from a workpiece to achieve improved chip breakage and increased tool life and which includes means for guiding the chips into substantial alignment with the coolant jet to enhance chip breakage.

These objectives are accomplished in a tool holder according to this invention which is capable of mounting inserts of varying shape and top surface configuration within a seat formed in a support bar so that the insert is forced downwardly, rearwardly and inwardly against the walls of the seat to securely clamp it therewithin. The tool holder also directs a high velocity coolant jet across the top surface of the insert and beneath chips formed from a workpiece to break the chips into small lengths and increase the life of the insert.

More specifically, the tool holder herein comprises a support bar formed with a C-shaped cavity, a mounting block secured within the cavity which is formed with a seat adapted to receive an insert having a top surface terminating with a cutting edge, and a clamping block mounted within the cavity atop the mounting block. The clamping block functions to both clamp the insert within the mounting block seat, and to direct a jet of high velocity coolant across the top surface of the insert for breaking chips formed from a workpiece into small lengths and to increase the life of the insert.

In one aspect of this invention, the tool holder herein is convertible to perform a variety of machining operations such as threading, turning, grooving and shaping. The conversion is accomplished by employing a number of mounting blocks which are each formed with a different seat to receive square, rectangular, diamond and round inserts. Each seat includes a bottom wall, rearward wall and an inner, side wall. Depending on the machining operation to be performed, the mounting block having the appropriately-shaped seat is mounted within the cavity in the support bar.

Another aspect of this invention involves securely clamping an insert within the seat formed in the mounting block. The clamping block of this invention is a generally rectangular shaped member having opposed side walls, a rear wall and a tapered forward wall which extends at an acute angle between a planar upper wall and a bottom wall. An outer edge of the upper surface is formed with a bevel which is angled inwardly from one side wall toward the opposite side wall, and which extends from the forward surface rearwardly toward the rear wall. The point at which the bevel terminates near the rear wall forms a bearing surface. The clamping block is adapted to be inserted atop the mounting block and insert, and beneath a top wall in the support bar defined by the C-shaped cavity.

The top wall formed by the cavity includes a threaded bore which terminates at the outer surface of the top wall with a recessed seat. When the clamping block is positioned atop the mounting block, its beveled edge aligns with the recessed seat of the threaded bore. A machine screw having a tapered head is insertable within the threaded bore and is tightened down so that its tapered head mates with a portion of the beveled edge formed in the clamping block. Preferably, the taper of the beveled edge of the clamping block and recessed seat of the threaded bore are approximately 41°, to receive the tapered head of the machine screw.

The bearing surface formed at the terminal end of the beveled edge in the clamping block also engages the tapered head of the screw when the clamping block is mounted in place. Preferably, the center of the area or line of contact between the bearing surface and screw is disposed rearwardly of the screw at an angle of at least about 10° with respect to a vertical plane passing through the longitudinal axis of the screw. When tightened down, the screw therefore applies a force against the bearing surface of the clamping block, which, because of the angle therebetween, has a downward, inward and rearward component. In turn, the insert is forced against the bottom wall, rear wall and inner side wall of its seat in the mounting block which greatly improves its stability during machining operations.

In a presently preferred embodiment, the clamping block herein is formed with a projection on its bottom surface adapted to mate with a V-shaped or U-shaped groove or notch formed in so-called "top-notch" inserts disclosed in U.S. Pat. No. 3,754,309, owned by Kennametal, Inc. The notch in the insert is angled along its top surface so that the projection engages the insert and urges it rearwardly and inwardly, as well as downwardly, within the seat in the mounting block both upon securing the clamping block in place, and during the machining operation.

If the inserts have a flat top surface, the bottom surface of the clamping block is modified to include a recess forming two spaced legs. For such flat-top inserts, the clamping block is mounted atop the insert so that one of the legs contacts the top surface of the insert and the other leg contacts the support bar. The clamping block frictionally engages the flat top surface of the insert urging the insert against the bottom wall, rear wall and side wall in the seat of the mounting block as the insert is mounted therewithin.

In both embodiments of the clamping block, the bottom wall thereof engages a major portion of the top surface of the insert from its rearward end to a point near the cutting edge. This is in contrast to the line contact near the rearward end of the insert which is obtained with prior art clamps, so as to provide much more stability of the insert within its seat. Although the projection formed in the bottom wall of one embodiment of the clamping block aids in securing a notched insert within its seat due to the engagement of the projection and notch, the insert is preferably also secured by frictional contact between the large surface area of the bottom wall of the clamping block and the top surface of the insert. Tolerances between the notched insert and clamping block are therefore less critical in mounting the insert securely in place compared to prior art clamps.

In another aspect of this invention, the tool holder herein is adapted to direct a high velocity coolant jet across the top surface of the insert and beneath the chips formed from the workpiece. In a presently preferred embodiment of this invention, a main fluid passageway is formed in the support bar which is connected by a fitting to an exterior delivery line from a high pressure pump. The other end of the main fluid passageway communicates with a connector passageway which terminates at a sidewall formed by the C-shaped cavity in the support bar.

The clamping block is formed with an internal, delivery passageway which decreases in cross section from an entrance opening to a discharge orifice formed at the base of its forward, tapered surface. An intermediate passageway formed in the clamping block connects the entrance opening of the delivery passageway with the connector passageway in the support bar when the clamping block is mounted in place atop the mounting block. Coolant is conveyed through the main passageway and connector passageway in the support bar, and then through the intermediate passageway of the clamping block, at a high pressure, preferably of about 1500–7500 psi and a low velocity of no greater than about 20 feet per second. The coolant is accelerated within the delivery passageway in the mounting block from its entrance opening to the discharge orifice so that a coolant jet is ejected from the discharge orifice having a velocity of at least about 250 feet per second. Preferably, the coolant jet is directed by the discharge orifice across the top surface of the insert at a 90° angle relative to the cutting edge of the insert, plus or minus about 10°.

In accordance with a further aspect of this invention, one embodiment of the tapered forward surface of the clamping block is formed with a chip guide which comprises a projection extending outwardly from the center of the tapered forward surface. The chip guide functions to guide the chips formed from the workpiece into substantial alignment with the discharge orifice formed in the clamping block.

Particularly in threading operations, it has been found that chips tend to shear from the workpiece at an angle of about 45° with respect to the longitudinal axis of the workpiece. Preferably, the chips should be directed at approximately a 90° angle relative to the longitudinal axis of the workpiece so that they move directly toward the coolant jet ejected from the discharge orifice formed in the clamping block for cooling and breakage as described above. The chip guide projection formed on the tapered front surface of the clamping block engages the chips as they are formed and turns them from a 45° angle relative to the axis of the workpiece into general alignment with the discharge orifice, at least for a fraction of a second. This enables the discharge orifice to more effectively direct the coolant jet across the top surface of the insert and beneath the chip.

This invention therefore provides a more reliable and stable means for clamping an insert within the cavity of a tool holder. With the mounting block of this invention being formed with a seat which receives the insert, greater versatility is provided by this invention than prior art tool holders. A mounting block formed with one type of seat configuration is easily replaced by a mounting block adapted to receive another insert configuration thus enabling the tool holder to be used for a variety of machining operations including threading, turning, shaping, grooving and profiling.

The coolant delivery aspects of this invention also provide improvements over prior art tool holders employing flood cooling techniques. The fluid delivery passageways and chip guide enable a high velocity coolant jet to be directed across the top surface of the insert and beneath the chips being formed which results both in the breakage of chips into short lengths and the reduction of heat in the area of the cut to prolong the life of the insert.

DESCRIPTION OF THE DRAWINGS

The structure, operation and advantages of a presently preferred embodiment of this invention will become further apparent upon consideration of the following description taken in conjunction with the accompanying drawings, wherein.

DETAILED DESCRIPTION OF THE INVENTION

Figure 1:
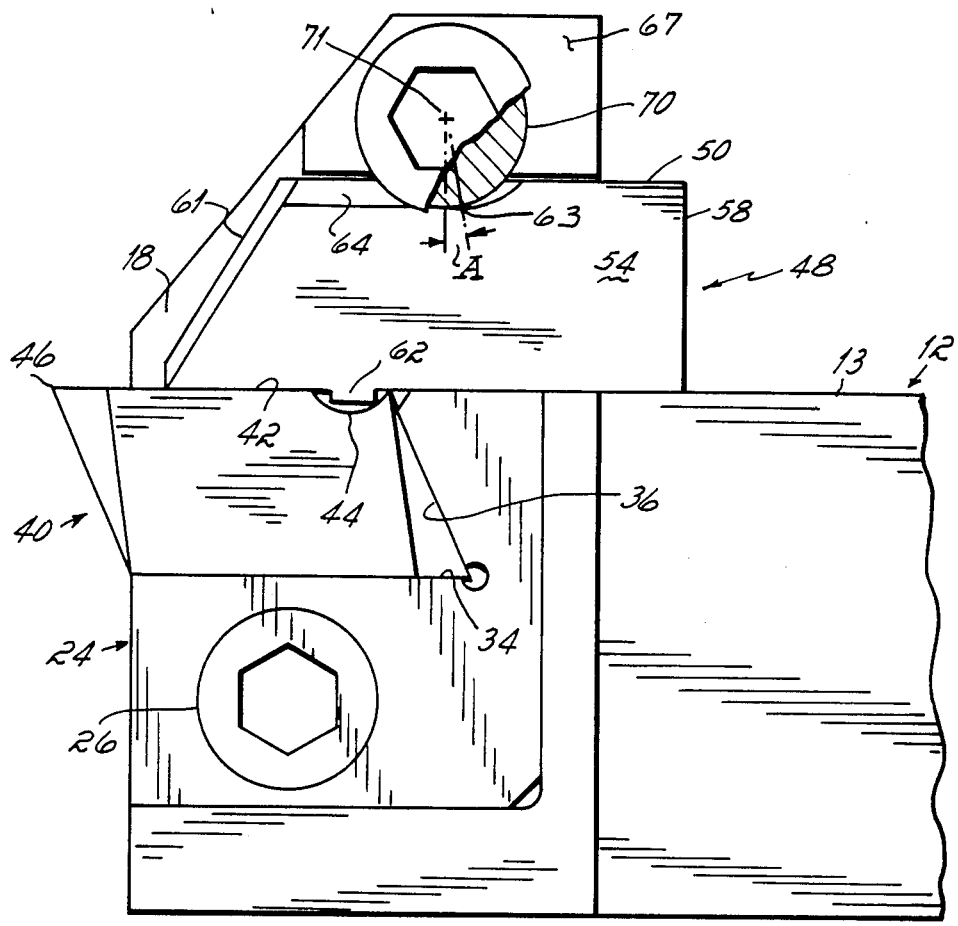
FIG. 1 is an assembled, side view of the tool holder according to this invention which is set up to perform a threading operation.

Referring now to the drawings, the tool holder 10 of this invention includes a support bar 12 having a C-shaped cavity 14 which forms a bottom wall 16, rear wall 18, sidewall 20 and top wall 22. The cavity 14 is adapted to receive a mounting block 24 which rests against its bottom, rear and side walls 16, 18, 20. The mounting block 24 is removably mounted within the support bar cavity 14 by a screw 26 which extends through a recessed throughbore 28 formed in the mounting block 24 and into a threaded bore 30 formed in the sidewall 20. The mounting block 24 includes a seat 32 which forms a bottom wall 34, a rear wall 36 and a sidewall 38.

The seat 32 of mounting block 24 is formed to receive an insert 40 which is specifically designed to perform a threading or grooving operation. The insert 40 includes a top surface 42 formed with an angled notch 44, and a cutting edge 46 at one end. It should be understood that while the tool holder 10 herein is illustrated in the drawings as a threading holder for purposes of describing the invention, the tool holder 10 may be modified by changing the configuration of mounting block 24. For example, the seat 32 formed in mounting bar 24 could be altered to receive a square, diamond, round or other shaped insert for performing machining operations such as turning, grooving, profiling and the like. It is contemplated that a number of mounting blocks 24 having different shaped seats will be utilized with the tool holder 10 of this invention so that a single support bar 12 may be easily adapted to perform a variety of machining operations.

As shown in FIG. 1, the insert 40 is received within the seat 32 of mounting block 24 so that its top surface 42 is exposed and the cutting edge 46 projects outwardly from the mounting block 24. In order to clamp the insert 40 in place within the seat 32, a clamping block 48 is mounted within the cavity 14 atop the mounting block 24 and insert 40. The clamping block 48 functions both to clamp the insert 40 within seat 32 and to direct a high velocity coolant jet across the top surface 42 of the insert 40 toward its cutting edge 46, as described in more detail below.

The clamping block 48 is a generally rectangular shaped member having a top wall 50, bottom wall 52, opposed sidewalls 54, 56, a rear wall 58 and front wall 60 which tapers inwardly from the bottom wall 52 to the top wall 50. In the embodiment of clamping block 48 shown in FIGS. 1 and 2, the bottom wall 52 is formed with a projection 62 which is adapted to mate with the notch 44 formed in the top surface 42 of insert 40. The insert 40 is preferably of the type disclosed in U.S. Pat. No. 3,754,309, owned by Kennametal, Inc. In addition, the tapered front wall 60 is formed with a projection or chip guide 61 for purposes to become apparent below.

A beveled edge 64 is formed at the intersection of the top wall 50 and sidewall 54 by an end mill or other suitable tool which extends from the front wall 60 rearwardly. The point at which the end mill exits the cut, which is short of the rear wall 58, forms a terminal end or bearing surface 63. The beveled edge 64 and bearing surface 63 are preferably tapered inwardly from the sidewall 54 toward the sidewall 56 at an angle of about 41° with respect to a vertical plane passing through the sidewall 54.

The top wall 22 of the cavity 14 formed in support bar 12 is formed with a threaded bore 66 which terminates in a tapered, partial seat 68 at the outer face 67 of the top wall 22. As shown in FIG. 1, the mounting block 48 is insertable within the cavity 14 atop the top surface 42 of the insert 40 and the mounting block 24 so that its beveled edge 64 aligns with the partial seat 68 in the support bar 12. The beveled edge 64 and tapered seat 68 together receive the tapered head 70 of a machine screw 72 insertable within the threaded bore 66.

In order to clamp the clamping block 48 in place, the machine screw 72 is inserted within the threaded bore 66 so that its tapered head 70 mates with the recessed seat 68 formed in the support bar 12 and engages the bearing surface 63 formed at the terminal end of the beveled edge 64. See FIG. 1. The bearing surface 63 is positioned so that the centerline of the area of contact with the tapered head 70 of screw 72 is disposed at an angle "A" of at least about 10° with respect to the longitudinal axis 71 of the screw 72. As shown in FIG. 1, the centerline of the area along which the screw 72 contacts the bearing surface 63 is spaced rearwardly along the beveled edge 64 of clamping block 48 from the longitudinal axis 71 of the screw 72. Preferably, the bottom surface 52 of mounting block 48 engages a major portion of the top surface 42 of insert 40 from its rearward end to a point near cutting edge 46.

The configuration and position of bearing surface 63 results in the exertion of forces in three directions against the insert 40 upon tightening of machine screw 72. As the machine screw 72 is threaded into the bore 66, its tapered head 70 engages the bearing surface 63 formed at the curved terminal end of the beveled edge 64. Because the bearing surface 63 is spaced rearwardly and at an angle of more than 10° from the longitudinal axis of the screw 72, and is beveled at a 41° angle, the resultant force applied to the bearing surface 63 by the machine screw 72 has a downward, rearward and inward component. These forces are transferred by the projection 62 formed on the bottom surface of clamping block 48 to the insert 40 due to engagement of the projection 62 with the angled notch 44 in the top surface 42 of insert 40. Tightening of the screw 72 against the bearing surface 63 thus urges the clamping block 48, and, in turn, the insert 40, donwardly against the bottom wall 34, rearwardly against the rear wall 36 and inwardly against the inner wall 38 of the mounting block seat 32.

Figure 3:
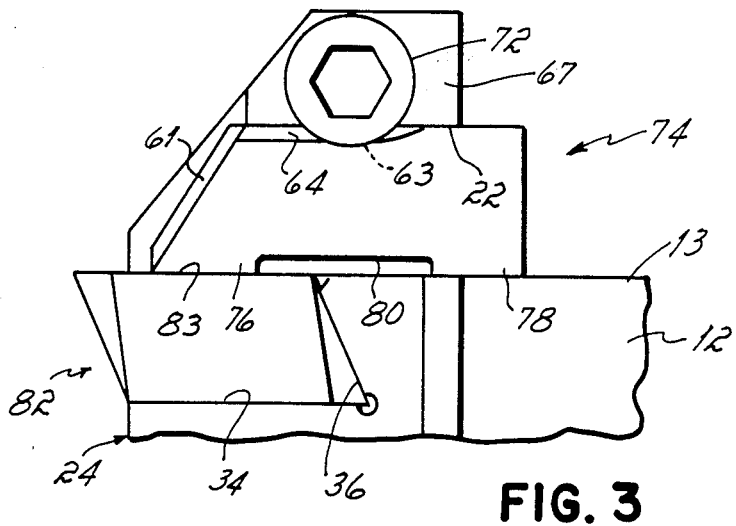
FIG. 3 is a partial side view of an alternative embodiment of the clamping block shown in FIGS. 1 and 2.

A clamping block 74, which is a modification of clamping block 48, is provided to accommodate an insert 82 having a planar top surface 83, as shown in FIG. 3. In this embodiment, the bottom wall of the clamping block 74 is formed with a pair of spaced legs 76, 78 with a recess 80 therebetween. Clamping block 74 is mounted within the cavity 14 so that its forward leg 76 engages the top surface 83 of insert 82 and its rearward leg 78 engages the top surface 13 of support bar 12. The remaining structural features of the clamping block 74 illustrated in FIG. 3 are identical to those of FIGS. 1 and 2 described above. Moreover, the spaced legs 76, 78 of clamping block 74 frictionally engage the top surface 83 of insert 82 and urge the insert 82 downwardly, inwardly and rearwardly against the seat 32 formed in the mounting block 24 upon tightening of screw 72, in the same manner as described above.

The clamping blocks 48 and 74 each securely mount the inserts 40, 82 within the mounting block seat 32. Engagement of the projection 62 in clamping block 48 with the notch 44 in insert 40 aids in clamping and maintaining the insert 40 in place during a cutting operation, and, in addition, the large area of contact between the bottom wall 52 of clamping block 48 and the top wall 42 of insert 40 ensures that the insert is secured within the seat 32. This feature of the invention is particularly important for mounting flat top inserts such as insert 82. The clamping block 74 frictionally engages the flat top 83 of insert 82 over a large surface area so that the insert 82 is mounted with improved stability within the mounting block seat 32.

Figure 2:
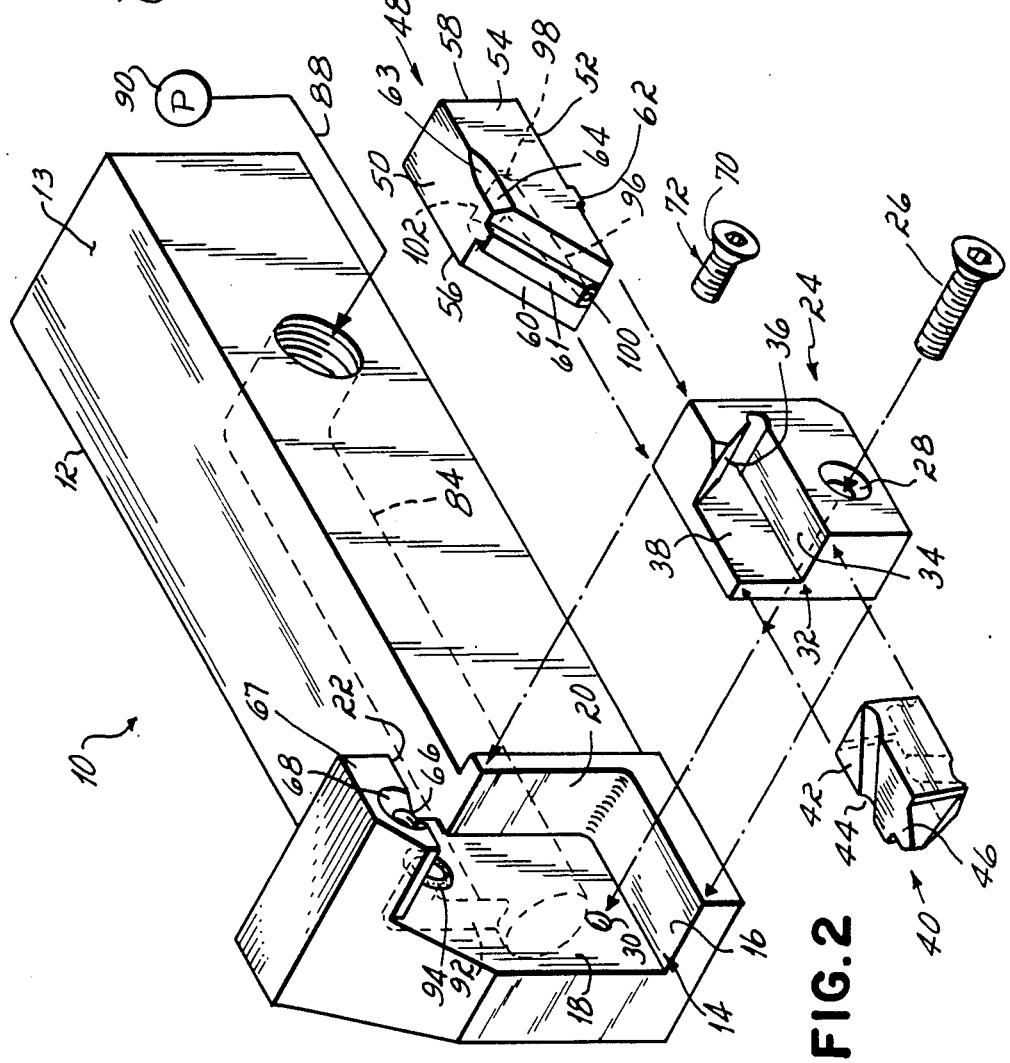
FIG. 2 is an exploded isometric view of the tool holder of FIG. 1.

As mentioned above, the clamping block 48 of this invention also functions to direct a high velocity coolant jet across the top surface 42 of insert 40 toward its cutting edge 46. The coolant delivery system of this invention is illustrated in FIGS. 1 and 2. The support bar 12 is formed with a longitudinally extending, main fluid passageway 84 which turns at a right angle to receive a fitting (not shown) connected to an exterior fluid delivery line 88. The external line 88 connects to a high pressure pump 90 shown schematically in the drawings for purposes of illustration. The main passageway 84 extends to the area of the sidewall 20 formed by cavity 14 and connects there to a connector passageway 92. The connector passageway 92 extends vertically upwardly from the main passageway 84 and then turns at a right angle where it terminates at the sidewall 20. An O-ring 94 is fitted over the terminal end of connector passageway 92 at the sidewall 20.

The clamping block 48 is formed with an internal, delivery passageway 96 having an enlarged entrance opening 98 at one end and a discharge orifice 100 at the other end formed in the base of the chip guide 61 in the tapered front wall 60. An intermediate passageway 102 extends from the entrance opening 98 of delivery passageway 96 to the sidewall 56 of clamping block 48. With the clamping block 48 mounted in position within the cavity 14, the intermediate passageway 102 engages the O-ring 94 at the end of connector passageway 92.

Coolant is thus directed from the pump 90 through the exterior delivery line 88 into the tool holder 10 where it flows through a main passageway 84, and connector passageway 92. The coolant then enters the intermediate passageway 102 of clamping block 48. Preferably, all of the passageways 84, 92, and 102, are sized so that a high pressure, low velocity coolant flow is directed to the entrance opening 98 of delivery passageway 96. Preferably, the velocity of the coolant up to the entrance opening 98 does not exceed about 20 feet per second at a pressure in the range of about 1,500–7,500 pounds per square inch.

The delivery passageway 96 tapers from a large cross section at the entrance opening 98 to a small cross section at the discharge orifice 100 so that the coolant is accelerated from the entrance opening 98 to the discharge orifice 100 forming a coolant jet (not shown) directed across the top surface 42 of insert 40. The relative diameters of the entrance opening 98 and discharge orifice 100 are sized to obtain an acceleration of the coolant from about 20 feet per second to at least 250 feet per second, and preferably up to 1,000 feet per second, at a coolant flow rate of approximately 2–10 gallons per minute for pressures ranging from 1,500–7,500 pounds per square inch.

As discussed in detail in my co-pending application Ser. No. 762,570, filed Aug. 5, 1985 and entitled "Method and Apparatus for Machining", which is incorporated by reference in its entirety herein, such a configuration of the delivery passageway 96 and passageways 84, 92, 100 enables the coolant jet to be directed between the top surface 42 of the insert 40, and the underside of chips formed from a workpiece, so as to substantially reduce the heat produced in the area of the cut and to break chips formed from a workpiece.

Figure 4:
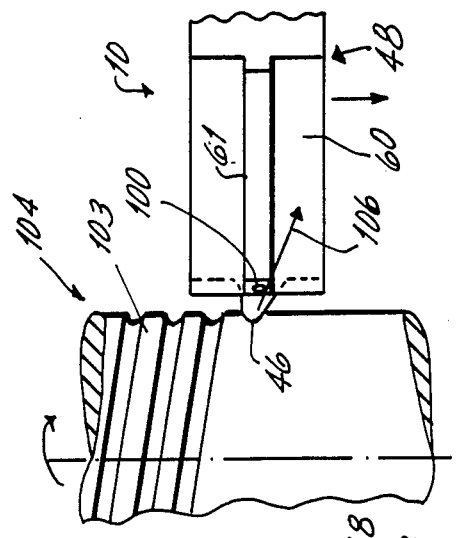
FIG. 4 is a partial plan view of the tool holder herein performing a threading operation with the clamping block shown in FIG. 1.

Referring now to FIG. 4, a schematic view of the tool holder 10 of this invention in the process of cutting threads 103 on a workpiece 104 is illustrated. The chips 106 produced by engagement of the insert 40 with the workpiece 104 during a threading operation, shown as an arrow in FIG. 4, tend to shear from the workpiece 104 at approximately a 45° angle with respect to its longitudinal axis. Therefore, only a portion of one side of the chip 106 passes by the discharge orifice 100 as it is sheared from the workpiece 104. In order to guide the chip 106 more directly into the path of the coolant jet ejected from the discharge orifice 100, the chip guide 61 is formed on the tapered front wall 60 of the clamping block 48. The chip guide 61 is an essentially rectangular projection formed in the center of the front wall 60, and the discharge orifice 100 is formed at its base. The chip guide 61 functions to engage the chips 106 as they are formed from the workpiece 104 and turn them substantially perpendicularly into the path of the coolant jet ejected from discharge orifice 100. This assures that the coolant jet extends beneath a substantial area of the underside of the chip 106 to achieve the desired cooling thereat.

While the invention has been described with reference to a preferred embodiment, it will be understood by those skilled in the art that various changes made by made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tool holder for machining a workpiece with an insert having a top surface terminating with a cutting edge, comprising:
   a support bar formed with a cavity defining a top wall having an outer face, said support bar being formed with a threaded bore terminating in a recessed seat at said outer face in said top wall;
   a mounting block formed with a seat having a bottom wall, a side wall and a rear wall;
   means for removably securing said mounting block within said cavity of said support bar, said seat of said mounting block receiving an insert so that the top surface of the insert is exposed;
   a clamping block disposed within said cavity beneath said top wall of said support bar and atop the exposed, top surface of the insert, said clamping block being formed with a beveled edge terminating with a bearing surface;
   a screw having a tapered head matable with said recessed seat in said outer face of said top wall of said support bar and said bearing surface of said clamping block, said screw being inserted into said threaded bore of said support bar so that said tapered head of said screw engages both said recessed seat in said support bar and said bearing surface in said clamping block to force said clamping block against the insert for clamping the insert against said bottom wall, said side wall and said rear wall of said mounting block.

2. The tool holder of claim 1 in which said clamping block includes a sidewall perpendicular to a top wall, said beveled edge of said clamping block being formed in said top wall at an angle of about 41° relative to a vertical plane passing through said sidewall of said clamping block, said head of said screw being tapered at an angle of about 41°.

3. The tool holder of claim 1 in which said bearing surface formed in said beveled edge of said clamping block is positioned rearwardly of said threaded bore in said top wall of said support bar upon mounting said clamping block within said cavity of said support bar, said screw being engagable with said bearing surface upon insertion within said threaded bore.

4. The tool holder of claim 3 in which said screw engages said bearing surface along a line of contact, said line of contact being disposed within a plane forming an angle of at least about 10° with respect to a vertical plane passing through the longitudinal axis of said threaded bore.

* * * * *